US011338268B2

(12) United States Patent
Llobregat Agustí et al.

(10) Patent No.: US 11,338,268 B2
(45) Date of Patent: May 24, 2022

(54) COMPOSITION FOR MINERALIZING CARBON DIOXIDE AND NITROGEN OXIDE GASES AND USES THEREOF

(71) Applicant: PRIMLAB GLOBAL, SL, Benidoleig (ES)

(72) Inventors: Juan Carlos Llobregat Agustí, Benidoleig (ES); José Antonio Sivera Marzá, Benidoleig (ES)

(73) Assignee: PRIMLAB GLOBAL, SL, Benidoleig (ES)

( * ) Notice: Subject to any disclaimer, the term of this patent is extended or adjusted under 35 U.S.C. 154(b) by 12 days.

(21) Appl. No.: 16/484,309

(22) PCT Filed: Feb. 8, 2018

(86) PCT No.: PCT/ES2018/070089
§ 371 (c)(1),
(2) Date: Aug. 7, 2019

(87) PCT Pub. No.: WO2018/146364
PCT Pub. Date: Aug. 16, 2018

(65) Prior Publication Data
US 2020/0001273 A1 Jan. 2, 2020

(30) Foreign Application Priority Data
Feb. 9, 2017 (ES) ................ ES201730156

(51) Int. Cl.
B01J 21/06 (2006.01)
B01D 53/86 (2006.01)
B01J 20/02 (2006.01)
B01J 20/04 (2006.01)
B01J 20/10 (2006.01)
B01J 20/26 (2006.01)
B01J 20/28 (2006.01)
B01J 20/32 (2006.01)
(Continued)

(52) U.S. Cl.
CPC ........ B01J 21/063 (2013.01); B01D 53/8628 (2013.01); B01D 53/8671 (2013.01); B01J 20/0229 (2013.01); B01J 20/0277 (2013.01); B01J 20/043 (2013.01); B01J 20/103 (2013.01); B01J 20/26 (2013.01); B01J 20/28026 (2013.01); B01J 20/3223 (2013.01); B01J 35/004 (2013.01); B01J 35/0013 (2013.01); B01J 35/026 (2013.01); B01J 37/0215 (2013.01); B60C 1/0016 (2013.01); B60C 11/0008 (2013.01); B01D 2255/2045 (2013.01); B01D 2255/2047 (2013.01); B01D 2255/20707 (2013.01); B01D 2255/20738 (2013.01); B01D 2255/30 (2013.01); B01D 2255/802 (2013.01); B01D 2255/9202 (2013.01); B01D 2257/404 (2013.01); B01D 2257/504 (2013.01)

(58) Field of Classification Search
CPC .. B01J 21/063; B01J 20/0229; B01J 20/0277; B01J 20/043; B01J 20/103; B01J 20/26; B01J 20/28026; B01J 20/3223; B01J 35/0013; B01J 35/004; B01J 35/026; B01J 37/0215; B01J 21/06; B01D 53/8628; B01D 53/8671; B01D 2255/2045; B01D 2255/2047; B01D 2255/20707; B01D 2255/20738; B01D 2255/30; B01D 2255/802; B01D 2255/9202; B01D 2257/404; B01D 2257/504; B60C 1/0016; B60C 11/0008; Y02C 20/40; C04B 14/30; C04B 41/50; C09D 5/00
See application file for complete search history.

(56) References Cited

U.S. PATENT DOCUMENTS

| 5,053,077 A * | 10/1991 | Crompton ................ C09D 5/18 106/18.16 |
| 2010/0012004 A1* | 1/2010 | Telander ................ B32B 5/022 109/49.5 |

(Continued)

FOREIGN PATENT DOCUMENTS

| ES | 1173883 | 1/2017 |
| KR | 20070089261 | 8/2007 |
| WO | 2005/082810 | 9/2005 |

OTHER PUBLICATIONS

Pavel Bredikhin et al., "Preparation of Basalt incorporated polyethylene composite with enhanced mechanical properties for various applications" MATEC Web of Conferences 96 (2017) (Year: 2017).*

(Continued)

Primary Examiner — Andrew J. Oyer
(74) Attorney, Agent, or Firm — Carmody Torrance Sandak & Hennessey LLP

(57) ABSTRACT

The invention relates to a composition for mineralising carbon dioxide and nitrogen oxide gases, which comprises a mixture of magnesium (between 1 and 25%), iron (between 1 and 23%), calcium monoxide (between 1 and 25%), titanium dioxide (between 0.1 and 11%) and silicon dioxide (between 16 and 75%), with a particle diameter between 100 nm and 4000 μm. The composition causes the mineralisation of carbon dioxide ($CO_2$) and of the gaseous chemical compounds known as "nitrogen oxides" ($NO_x$) in the atmosphere. This composition can be added or mixed as an additive in paints, dyes, resins and elastic polymers (gum and natural rubber) in parts with wear, and for any type of covering.

6 Claims, No Drawings

(51) Int. Cl.
  *B01J 35/00*   (2006.01)
  *B01J 35/02*   (2006.01)
  *B01J 37/02*   (2006.01)
  *B60C 1/00*    (2006.01)
  *B60C 11/00*   (2006.01)

(56) References Cited

U.S. PATENT DOCUMENTS

2013/0168228 A1   7/2013   Ozin et al.
2013/0319589 A1*  12/2013  Sato .................. B60C 1/0016
                                                152/209.5

OTHER PUBLICATIONS

Tobaldi, et al., "Photocatalytic activity for exposed building materials," Journal of the European Ceramic Society, vol. 28, pp. 2645-2652, May 16, 2008.

* cited by examiner

COMPOSITION FOR MINERALIZING CARBON DIOXIDE AND NITROGEN OXIDE GASES AND USES THEREOF

OBJECT OF THE INVENTION

The object of the invention is the mineralization of carbon dioxide ($CO_2$) and gaseous chemical compounds known as anthropogenic "nitrogen oxides" ($NO_x$) in the atmosphere, which allows the capture and decomposition of said harmful gases to reduce the increase in the greenhouse effect and its consequences to health This composition allows atmospheric $CO_2$ and $NO_x$ to be eliminated, both individually and collectively, helping to reduce the impact created by these gases. For this, a specific formulation is used with components that mineralise, absorb/adsorb $CO_2$ and $NO_x$ turning them into a white calcareous powder. These components can be added or mixed in paints, dyes, resins and elastic polymers (natural rubber and gum) or for any type of covering.

The present invention is intended for pollution control and for the industrial sectors for paints, dyes, resins and natural rubber, and gum products.

BACKGROUND OF THE INVENTION

Climate change is the greatest environmental threat of the 21st century, with major economic, health and environmental consequences. Everybody, without exception: citizens, businesses, economies and nature around the world are being affected. The lethal effects of high concentrations of $CO_2$ and $NO_x$ are well known, but anthropogenic levels of these gases are of concern to both survivors of high $CO_2$ and $NO_x$ exposure and individuals experiencing prolonged low level exposure.

In seeking the cause of this acceleration, it has been demonstrated that there is a direct relationship between global warming or climate change and the increase in greenhouse gas emissions, such as carbon dioxide ($CO_2$), methane ($CH_4$), water vapour, nitrous oxide ($NO_2$), hydrofluorocarbon (HFC) or perfluorocarbon (PFC) gases and sulphur hexafluoride ($SF_6$), caused by both developed and developing human societies (anthropogenic) (by industrialisation based on fossil fuels and/or other chemical components). The level of $CO_2$ emissions has increased by 31%; methane ($CH_4$) has increased by 145% and nitrogen oxides ($NO_x$=$NO$+$NO_2$) by 15%. $CO_2$ and $NO_x$ are of great relevance in city centres due to their degree of pollution. It is known that $CO_2$ concentrations in the atmosphere currently exceed those reached in the last half million years, and probably in the last 20 million years, being currently over 400 ppm (according to the National Oceanic and Atmospheric Administration of the United States—NOAA) (Pieter Tans, 2016) and the trend is that this acceleration will be exponential if measures to control it are not taken.

$CO_2$ is a primary pollutant. Given its natural presence in the atmosphere and its lack of toxicity, it should not be considered a polluting substance, but there are two circumstances that make it a major pollutant today: it is a gas that produces a major heat trapping effect, the so-called greenhouse effect, and its concentration is increasing in recent years due to the burning of fossil fuels and large areas of forests.

Nitrogen oxides are a group of gases composed of nitric oxide (NO) and nitrogen dioxide ($NO_2$). The term $NO_x$ refers to the combination of the two substances.

Nitrogen dioxide is the main pollutant among nitrogen oxides, and it is formed as a by-product in all combustions carried out at high temperatures. It is a yellowish coloured substance, which is formed in combustion processes in motor vehicles and power plants. It is a toxic, irritating gas and precursor to the formation of nitrate particles, leading to the production of acids and high levels of 2.5 micron suspended particles (PM) in the environment. It has a good solubility in water, reacting and forming nitric acid ($HNO_3$) according to the following reaction: $NO_2+H_2O \rightarrow 2\ HNO_3+NO$. This substance is a strong oxidiser and reacts violently with combustible and reducing materials, being able to attack metal materials in the presence of water.

The effects of $CO_2$ on a specific individual depend on the concentration and duration of exposure, as well as individual factors such as age, health, physiological composition, physical activity, occupation and lifestyle. Constant (high or low) exposure to $CO_2$ and $NO_x$ may result in significant persistent adverse health effects, such as headaches, dizziness, lack of memory and concentration, difficulty sleeping, tinnitus, double vision, photophobia, loss of eye movement, visual field defects, enlarged blind spots, poor adaptation to darkness, respiratory or cancer problems, and personality changes, among other health problems.

Likewise, the phenomenon called acid rain also occurs. $NO_x$ due to ambient humidity and solar ultraviolet radiation, react with hydroxyl radicals to form nitric acid, which together with the sulphurous and sulphuric acids formed from $SO_2$ modify the pH of the water and form the so-called acid precipitation.

There are different, very expensive and economically non-viable methods of reducing the level of $CO_2$, such as $CO_2$ sequestration when injected directly into the depths of the oceans.

The impacts of $NO_2$ on human health and the environment are well known. It is a substance that is corrosive to the skin and respiratory tract, causing redness and severe skin burns. Inhalation at high concentrations and for a short period of time can cause pulmonary oedema whose effects are not observed until a few hours later, being aggravated by physical exertion. Prolonged exposure can affect the immune system and the lungs, resulting in reduced resistance to infections and irreversible changes in lung tissue.

The large-scale use of titanium dioxide coverings is of particular interest, since their photocatalytic effect causes the disintegration of harmful substances in the air. This disintegration has long been known as an efficient method for transmutation of harmful substances into harmless products, using solar energy, which is based on the ability to capture free radicals generated by the absorption of light on the semiconductor surface and using them for electron transfer reactions.

There are currently products on the market, such as photocatalytic paints, that include titanium dioxide to neutralise $NO_x$ as demonstrated by the patent PCT/US2008/074876 (the description of which is incorporated for reference), other products that absorb $CO_2$ (such as cements and paints) and various techniques to sequester said harmful gases. The main problems with these products are that photocatalytic paints with titanium dioxide transform $NO_x$ generating $CO_2$ and $H_2O$ as by-products and increasing the $CO_2$ levels. Paints whose composition is based on $Ca(OH)_2$, calcium hydroxide, to absorb $CO_2$ have the drawback that they are simply absorbing $CO_2$ and increasing the weight of the surface where they are applied.

DESCRIPTION OF THE INVENTION

The present invention is aimed at the mineralisation of $CO_2$ carbon dioxide and $NO_x$ nitrogen oxides with a single mineral composition to reduce their environmental impact and to reduce the risks to human health. The main inorganic materials of our composition are preferably from igneous rocks, sedimentary and metamorphic rocks (magnesium, iron, calcium monoxide, silicon dioxide, titanium (IV) oxide), the latter being used as a photocatalyst. They are mixed in the manufacture of paints, dyes and natural rubber/gum materials at between 0.5% and 15% by weight and with a particle diameter of between 100 nm and 4000 µm, for example measured by filtering with laboratory sieves. Paints and/or dyes are applied directly onto surfaces of different forms, such as on walls, floors, all types of road signs, vehicles, textiles, plastic compounds, etc.

Adsorption is a process through which atoms, ions, or molecules are trapped or retained on the surface of a material, acting as a molecular sieve. Absorption is a physical process of a solid substance or liquid that attracts or retains, respectively, a liquid, a gas, or steam.

The mode of action of the paint, natural rubber/gum with our formulation is by the carbonation and nitrification process at room temperature. When they come into contact with the environmental $CO_2$ or $NO_x$ they have an absorption/adsorption power, through the aforementioned processes, to chemically trap the particles of these gases converting them into by-products (into white calcareous powder). $CO_2$ and $NO_x$ become these by-products and become trapped on the surface, thus dispersing to the ground through rain or environmental elements (wind, rain, snow, etc.), these by-products are beneficial to the environment and are not harmful to health.

Our composition, once applied to the various materials mentioned above, when it comes into contact with carbon oxides and nitrogen oxides, initiates a carbonation and nitrification process through which it absorbs/adsorbs and transforms $CO_2$ and NOR. The reaction of these minerals in the present invention $(MgFeCaOTiO_2)+SiO_2+3CO_2=MgCO_3+FeCO_3+CaCO_3+TiO+SiO$. The composition is rich in Mg (between 1 and 25% by weight), Fe (between 1 and 23%), CaO (between 1 and 25%), $TiO_2$ (between 0.1 and 11%), and $SiO_2$ (between 16 and 75%) performing the natural process of absorption/adsorption and transformation of the $CO_2$. ($TiO_2$) titanium (IV) oxide is a photocatalyst that uses sunlight or artificial light to absorb nitrogen oxides (NO and $NO_2$) and transform them into harmless nitrates ($NO+O_2^- \rightarrow NO_3$, $NO_2+OH \rightarrow H^+ + NO_3$).

The reaction between our composition and $CO_2$ can be simplified as two processes taking place at the same time: $Mg/Fe/CaO/TiO_2+4CO_2 \rightarrow MgCO_3$, $FeCO_3$, $CaCO_3$, $TiO_2$ (powder conversion of magnetite, siderite, limestone and titanium (IV) dioxide) which acts as a light catalyst for the nitrification of NOR and Si $(O_2) \rightarrow SiO_2$ (conversion of equivalent cristobalite to quartz). The first is the production of carbonate minerals, which sequesters $CO_2$. The second is the conversion of cristobalite to quartz.

The durability of our composition depends on the area in which the product is exposed, that is, as long as minerals remain in the applied product there will be carbonation and nitrification. There are parts on the planet that exceed 400 ppm of $CO_2$ in the air, while others have lower levels, the same occurs with NOR concentrations. The paints remain active for between approximately 7 and 10 years, depending on the weather conditions. This is the durability of the composition; and in natural rubber or gum products, depending on their use, such as, for example, a vehicle wheel, it depends on the wear of the tyre. In natural rubber or gum elements, since natural rubber and gum are not porous, only the outer part is effective. However, in the case of tyres, the part of the composition that is in contact with the air is renewed as the vehicle wheels are worn. Therefore, in the invention it is preferred to use the composition in natural rubber or gum elements subject to wear, since otherwise the effectiveness is further reduced.

Our composition is made with igneous rocks, although it can also be manufactured chemically, but this process is more expensive and its production would increase the carbon footprint. With this composition, in addition to removing $NO_x$ and $CO_2$, $CO_2$ forming the photocatalysis of the catalyst present in the paint, natural rubber/gum "$TiO_2$" is also removed, which, in the reaction with $NO_x$, the substances produced are $NO_3^-$ ions, $H_2O$ and $CO_2$.

PREFERRED EMBODIMENT OF THE INVENTION

The present invention relates to a composition preferably consisting of mineral compounds extracted and selected from igneous rocks with the following mineral composition $(Mg/Fe/CaO/TiO_2)+SiO_2$, which are used for the mineralisation of $CO_2$ and $NO_x$ from the atmosphere, which allows the capture and decomposition of said harmful gases to reduce the increase in the greenhouse effect and its consequences to health, converting said gases into a white calcareous powder. These compounds are used and mixed in the manufacture of paints, dyes (for use on façades, aircrafts, house interiors, etc.) and natural rubber/gum materials (for the manufacture on wheels of vehicles also called rims or tyres and various natural rubber or gum products) all mixed in a percentage by weight of between about 0.5% and 15% and with a specific particle diameter of mineral components between 100 nm and 4000 µm.

A preferred object of the invention is a mineral mixture for use in paints, either in their manufacture or as a separate component that can be added/mixed in the paint itself immediately before application. This composition is suitable for the mineralisation of carbon dioxide and nitrogen oxides comprising the above-mentioned mixture of compounds. Its preferred use will be as an additive in paints, lacquers and/or varnishes.

Another preferred use of the composition of the invention is the manufacture of tyres or other natural rubber and/or gum elements, preferably elements subject to wear. Tyres are mainly made of rubber, have practically no porosity, and as they wear out the product is renewed and always acts with toxic gases. In most countries the tyre tread must have a depth greater than 1.6 mm (European Union) or 2/32 inches (United States). As the tyre thickness decreases the product or mineral compound of our invention performs the carbonation and nitrification process, minimising environmental problems without deteriorating the quality of the tyre and practically without increasing the tyres' cost.

Example 1

A study was carried out with different types of paints to observe the absorption/adsorption of our composition:

Various types of materials were used for this experiment, wood, plastic, metal sheet and ready-mixed cement, to see the absorption of $CO_2$ emitted by dry ice or carbonic snow. The cement was prepared from Holcim ready-mixed cement. Various types of acrylic and plastic paint were prepared, both with 5% and 10% of the igneous rock mineral composition (10% Mg, 6% Fe, 10% CaO, 2% $TiO_2$ and 72% $SiO_2$) with a particle thickness of 800 µm.

Of all materials used approximate rectangles from between 18 to 21 cm² were cut. All surfaces were cleaned and left free of dust. All samples were painted two days before the experiment so that the samples were dry and could be weighed at time 0 (T=0). The weights were recorded in the data collection notebook. All samples were placed in several glass boxes (a 4 L capacity tank) where carbon dioxide snow (also weighed—measurements ranged from 29.4 g to 30.5 g) was introduced, and they were sealed. The samples were left out of sunlight for 92 h (T=92) and were weighed again after that time.

From each material, an unpainted sample, a painted sample without composition, a painted sample with 5% composition and another painted with 10% composition were introduced into the corresponding box. With the cement samples 29.5 g of dry ice were introduced, with those of wood 30.5 g, with those of plastic 29.4 g and with those of metal sheet 30.1 g, all having evaporated by the end of the tests.

TABLE 1

Differences in weight of $CO_2$ exposed materials

| Material | Block weight (g) | | |
|---|---|---|---|
| | 0 h | 92 h | Difference |
| Only cement | 55.0 | 55.4 | 0.4 |
| Painted cement (A) | 44.2 | 44.87 | 0.67 |
| Painted cement (A) 5% | 54.7 | 56.2 | 1.5 |
| Painted cement (A) 10% | 52.3 | 53.93 | 1.65 |
| Only wood | 23.5 | 23.5 | 0.0 |
| Painted wood (A) | 23.4 | 23.5 | 0.1 |
| Painted wood (A) 5% | 23.4 | 24.4 | 1.0 |
| Painted wood (A) 10% | 23.4 | 24.7 | 1.3 |
| Only plastic | 2.5 | 2.5 | 0.0 |
| Painted plastic (B) | 2.4 | 2.4 | 0 |
| Painted plastic (B) 5% | 2.4 | 3.3 | 0.9 |
| Painted plastic (B) 10% | 2.4 | 3.6 | 1.2 |
| Only metal sheet | 9.1 | 9.1 | 0 |
| Painted metal sheet (B) | 9.4 | 9.5 | 0.1 |
| Painted metal sheet (B) 5% | 9.4 | 10.4 | 1.0 |
| Painted metal sheet (B) 10% | 9.6 | 10.7 | 1.1 |

The materials in Table 1 were painted as follows: Cements and wood with acrylic paint (A), plastic and metal sheet with plastic paint (B). Unpainted materials were introduced into the boxes to see if they had $CO_2$ absorption/adsorption on their own.

$CO_2$ absorption/adsorption has been observed with the different materials used, ranging from 0.9 g to 1.65 g. That which absorbed the most was cement, followed by wood and plastic, and finally by metal sheet. Both acrylic paints and plastics had absorbed/adsorbed $CO_2$ and it was observed that on the surfaces where the paints with the formulation had been applied there was a white calcareous powder.

Example 2

Another experiment was performed with water-based paint (that used on vehicles) with 5% of the igneous rock mineral composition (with 10% Mg, 6% Fe, 10% CaO, 2% $TiO_2$ and 72% $SiO_2$) with a thickness of 800 µm, which was used on metal sheet surface, without lacquer or varnish as the final finish, and it was observed that there was absorption/adsorption of $CO_2$ by carbonation similar to the acrylic and plastic paints.

The same experiment was performed to see the effectiveness of the lacquer/varnish without adding our compound, using water-based paint with 5% of our compound on the metal sheet and applying the lacquer/varnish on it. It was observed that there was no absorption/adsorption of $CO_2$, since the varnish seals it, protecting it from environmental elements.

Likewise, we performed another test with water-based paint (with 5% of our compound), on a metal sheet surface and with lacquer/varnish with 5% of our compound and it was observed that there was absorption/adsorption of $CO_2$ by carbonation similar to the acrylic and plastic paints.

By conducting these types of experiments, it has been shown that using paints or varnishes with virtually no porosity, as long as the mineral compound with our formulation is present, the product will continue to absorb $CO_2$.

Example 3

Another experiment performed to observe the absorption/adsorption of nitrogen oxides (NOR) was performed as follows. Plastic, iron sheet and ready-mixed cement were used to see the absorption/adsorption of the subjected $NO_2$. The samples were painted with plastic paint with 5% of the igneous rock mineral composition (with 10% Mg, 6% Fe, 10% CaO, 2% $TiO_2$ and 72% $SiO_2$) with a particle thickness of 800 µm, and were left to dry.

The dried samples were introduced into four-litre capacity tanks with 20 g of $NO_2$ gas (Sigma-Aldrich) in the tank, the tanks were sealed and exposed to sunlight during the day and artificial light overnight for 6 consecutive days.

After 6 days, the contents of the tank were analysed and it was possible to observe that there was no $NO_2$, as measured by a gas analyser $NO/NO_2/NO_x$ Serinus 40. In this experiment there were two chemical processes, the first was the transformation of the $NO_x$ by the action of $TiO_2$ with light into $NO_3^-$ (ions), $H_2O$ and $CO_2$ (photocatalysis), and the other was the mineralisation of the $CO_2$ by the composition of our formulation, which was produced by the reaction of $TiO_2$ with the NOR, into a thin layer of white powder of calcareous appearance.

It was also observed that there was some moisture due to the production of $H_2O$ by $TiO_2$.

In this way, it was verified that the formula completely eliminated $NO_2$ and in turn mineralised, by the carbonation process, the $CO_2$ produced by $TiO_2$.

The invention claimed is:

1. A coating for mineralizing gases of carbon dioxide and nitrogen oxides comprising between 0.5 and 5% by weight of a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 µm.

2. A paint, lacquer, dye, resin, and/or varnish, for mineralizing gases of carbon dioxide and nitrogen oxides comprising a percentage by weight of between 0.5 and 5% of a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 µm.

3. A method of using a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 μm as an additive for mineralizing gases of carbon dioxide and nitrogen oxides in paints, lacquers, dyes, resins, and/or varnishes, comprising the step of adding a percentage by weight of between 0.5 and 5% of the composition to the paint, lacquer, dye, resin and/or varnish.

4. A method of using a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 μm as an additive for mineralizing gases of carbon dioxide and nitrogen oxides in a coating, comprising the step of adding a percentage by weight of between 0.5 and 5% of the composition to the coating.

5. A method of mineralizing gases of carbon dioxide and nitrogen oxides comprising using a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 μm as an additive in paints, lacquers, dyes, resins and/or varnishes, comprising the step of adding a percentage by weight of between 0.5 and 5% of the composition to the paint, lacquer, dye, resin and/or varnish.

6. A method of mineralizing gases of carbon dioxide and nitrogen oxides comprising using a composition comprising a mixture of igneous rocks which comprises between 1 and 25% by weight of magnesium, between 1 and 23% of iron, between 1 and 25% calcium monoxide, between 0.1 and 2% of titanium dioxide and between 16 and 75% of silicon dioxide, with a particle diameter between 100 nm and 4000 μm as an additive in a coating, comprising the step of adding a percentage by weight of between 0.5 and 5.4% of the composition to the coating.

\* \* \* \* \*